United States Patent

Santucci, Vincent J.

[15] 3,658,072

[45] Apr. 25, 1972

[54] APPARATUS FOR TREATING FOODSTUFF

[72] Inventor: Vincent J. Santucci, Box 490, R.D. #1, West Grove, Pa. 19390

[22] Filed: Nov. 28, 1969

[21] Appl. No.: 880,558

[52] U.S. Cl. ............................................134/65, 134/133
[51] Int. Cl. ......................................B08b 3/02, B08b 11/00
[58] Field of Search .............................134/65, 69, 132, 133

[56] References Cited

UNITED STATES PATENTS

| | | | |
|---|---|---|---|
| 2,558,138 | 6/1951 | Johnson | 134/132 |
| 2,314,871 | 3/1943 | De Back | 134/65 |
| 2,392,911 | 1/1946 | Gaudet | 134/157 |
| 1,960,692 | 5/1934 | Brown et al | 134/65 |
| 2,696,821 | 12/1954 | Streets | 134/65 |
| 3,135,668 | 6/1964 | Wesson | 134/65 X |

Primary Examiner—Robert L. Bleutge
Attorney—Markva & Smith

[57] ABSTRACT

Foodstuff is fed into one end of a washing zone at a rate faster than the rate the foodstuff passes through the washing zone to form a buildup within the washing zone. Jets of washing liquid are introduced directly onto the foodstuff within the washing zone. The buildup of foodstuff is constantly moved through the washing zone with a swaying and tumbling motion without causing damage to the foodstuff. The apparatus includes at least one rotatable drum which provides a washing zone. The drum has an inner structural configuration to cause the foodstuff to move from one end to the other thereof when the drum is rotated. Feed means are used to introduce the foodstuff into one end of the drum at a rate faster than the foodstuff passes through the drum to form a buildup of foodstuff. Nozzle means located within the drum are used to impinge washing liquid directly onto the foodstuff. Means are provided to rotate the drum causing the foodstuff to have a swaying and tumbling motion without producing damage to the foodstuff. The apparatus of this invention is used in a very specific way to wash and clean fresh mushrooms.

7 Claims, 5 Drawing Figures

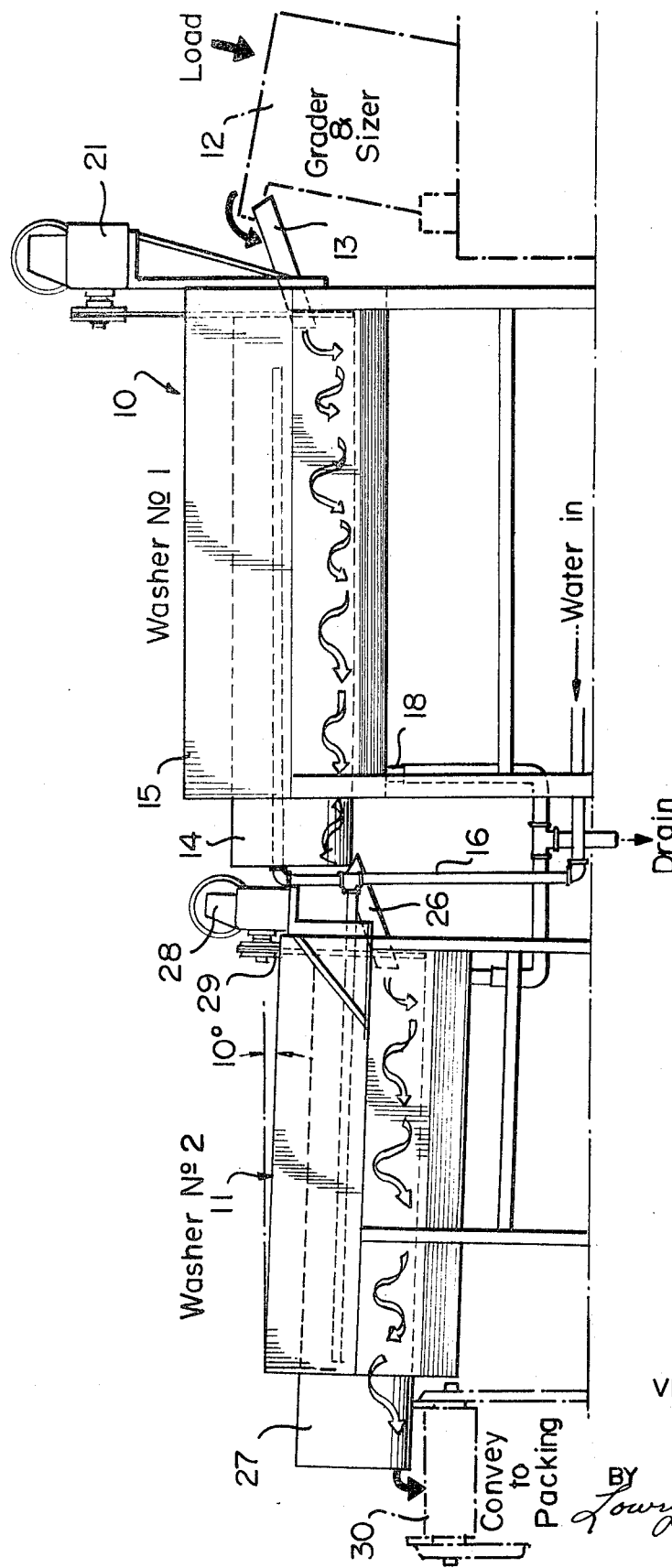

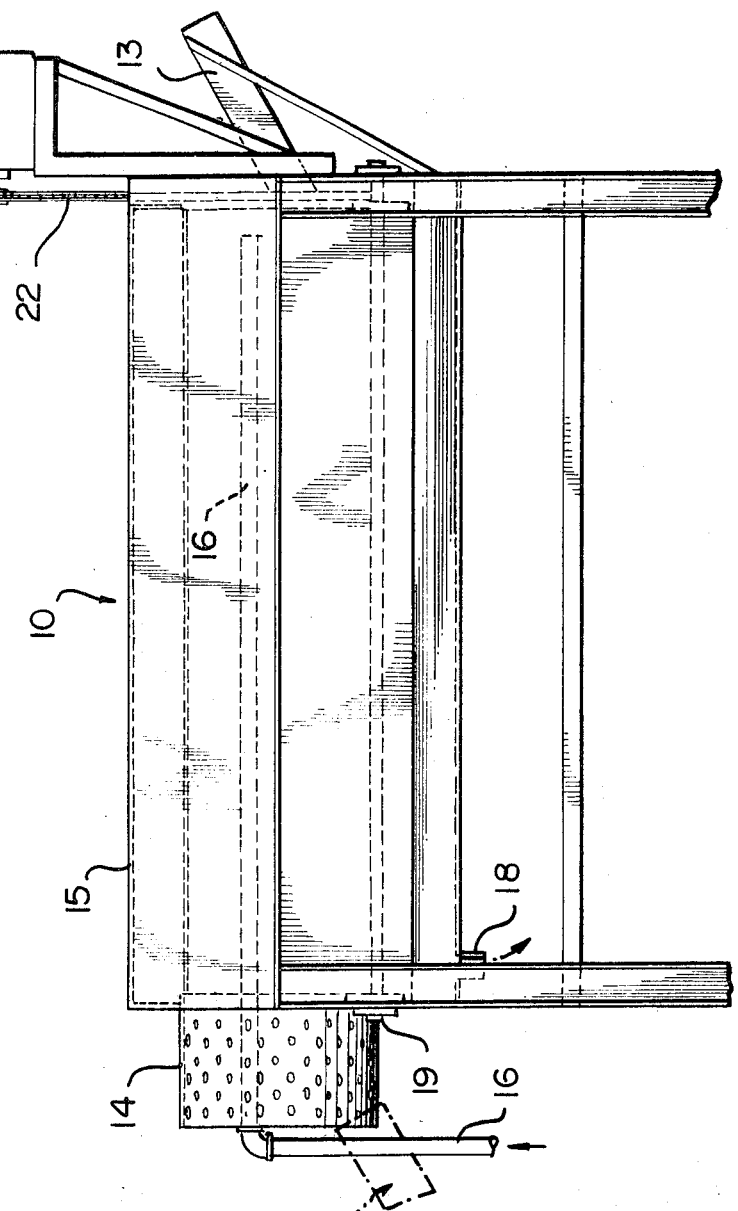
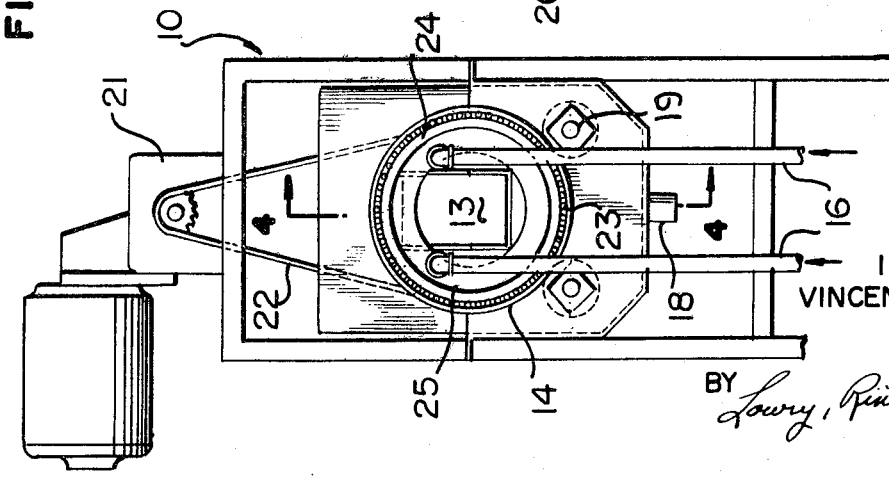

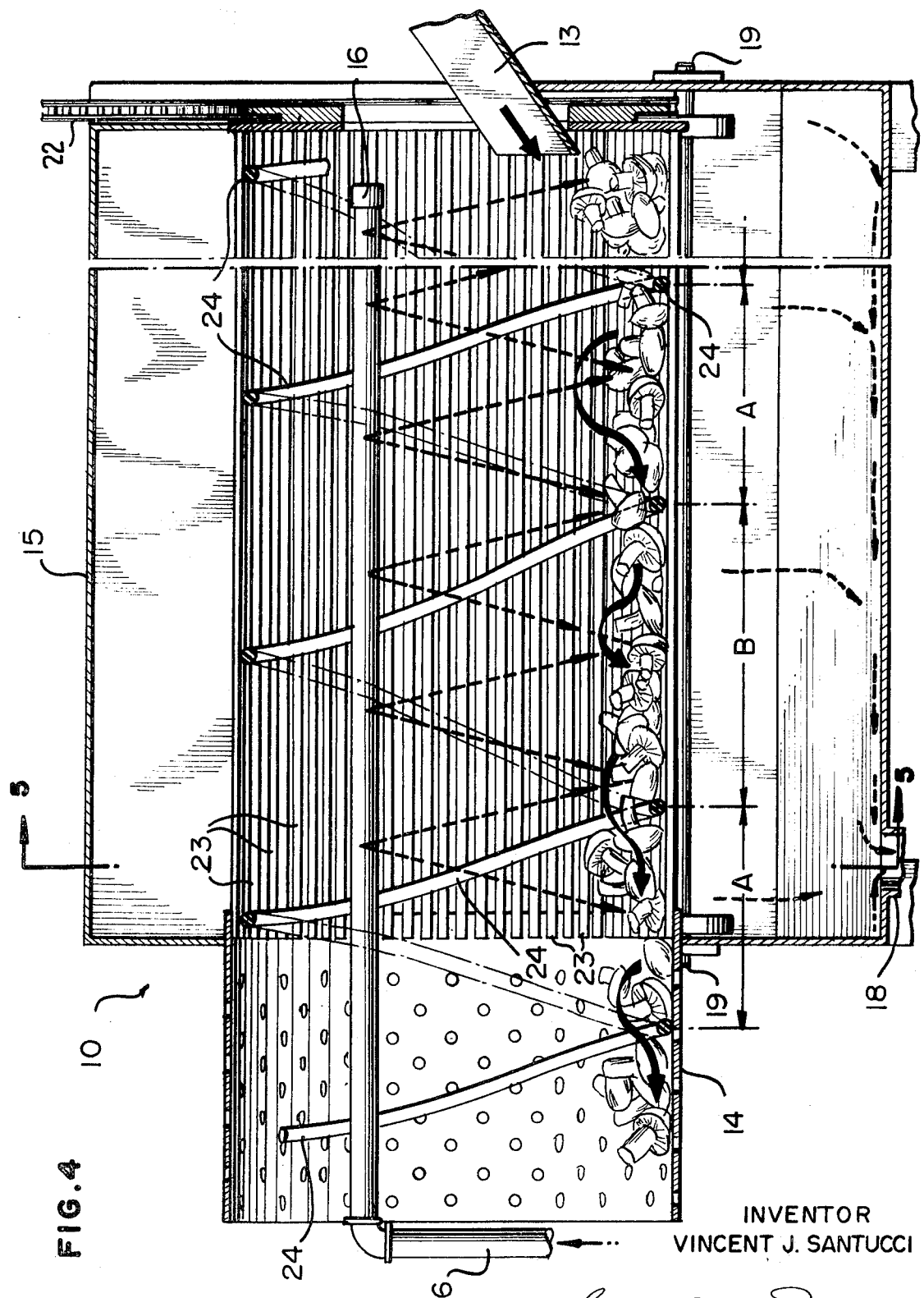

INVENTOR
VINCENT J. SANTUCCI

APPARATUS FOR TREATING FOODSTUFF

BACKGROUND OF THE INVENTION

The use of a rotatable drum in the treating of foodstuff is generally known in the prior art. In these known prior art devices, the foodstuff may be fruit or vegetables. The inner construction of the rotatable drum is such that the foodstuff is advanced through the washing zone by having its course repeatedly elevated and subsequently dropped into a washing liquid. The apparatus as shown in U.S. Pat. No. 1,352,393 is used to remove the peel or skin of fruits that are caused to pass through the washing zone. The use of this apparatus to effect the method of this invention is therefore not possible.

In another prior art washing machine as disclosed in U.S. Pat. No. 2,392,911, corrugations are provided longitudinally along the inner surface of the drum. The washing machine may be used for either vegetables or ores. A spray head is mounted in the drum and fed with washing fluid from a suitable source. When the foodstuff has completed its washing cycle within the drum, the drum is tilted and the material subsequently discharged. This prior art device is generally involved with a batch type process.

A general problem associated with the prior art devices is to find an apparatus which may efficiently and quickly wash foodstuff without causing damage thereto. It is desired to find such an apparatus to effect a method for continuously washing foodstuff rather than to be limited to a batch type process.

A more specific problem faced by the prior art is associated with the washing of mushrooms. Mushrooms constitute a form of foodstuff which may be easily bruised. At the same time, mushrooms tend to absorb liquid material which may cause spoilage thereof. In addition, the stems of the mushrooms will very easily be separated from the crowns. Therefore, where there is an extreme amount of handling, the mushrooms will be bruised and broken and thereby made less fit for commercial consumption. Obvious problems would be incurred during the storage or transportation of fresh mushrooms which had absorbed liquid before final consumption by the consumer.

In the past, it has not been possible to expedite the washing and handling of fresh mushrooms to increase the efficiency and productivity associated with the processing of mushrooms for the fresh market. The prior art has not developed a way in which the mushrooms may be cleaned very easily and rapidly and without any physical damage to the mushrooms or spoilage due to the absorption of water or other liquid medium used in the cleaning thereof.

PURPOSE OF THE INVENTION

It is the primary object of this invention to provide an apparatus for quickly and effectively washing foodstuff without damage thereto.

It is another object of this invention to provide an apparatus for continuously treating foodstuff in a washing zone where the foodstuff is subjected to a swaying and tumbling motion while having a jet spray of washing liquid impinge directly thereon.

It is a further object of this invention to provide apparatus for washing fresh mushrooms with a washing liquid such as water, by passing a buildup of the mushrooms through a washing zone in a time effective to avoid absorption of the water by the mushrooms and at the same time to avoid any damage to them.

It is a still further objective of this invention to provide an apparatus for treating foodstuff such as mushrooms in at least one rotatable drum which is combined with various structural elements to move the foodstuff from one end to the other in a swaying and tumbling motion without producing damage to the foodstuff.

It is a still further object of this invention to provide an assembly for treating mushrooms wherein there are two rotatable drums in combination with a feed means to move a buildup of mushrooms from one end of the assembly to the other so that the mushrooms pass through the washing zone at a rate effective to wash the mushrooms completely and thoroughly without absorbing water.

SUMMARY OF THE INVENTION

The method of this invention comprises the steps of feeding the foodstuff into one end of the washing zone at a rate faster than the rate the foodstuff passes through the washing zone thereby forming a buildup of the foodstuff. Jets of washing liquid are directly impinged on the foodstuff as it passes through the washing zone. The buildup of foodstuff is moved constantly through the washing zone with a swaying and tumbling motion in a very gentle manner to avoid causing damage to the foodstuff. In a more specific embodiment of the method fresh mushrooms are caused to move through the washing zone in a very gentle manner in a time effective to avoid the absorption of the water used as a washing medium.

The apparatus assembly made in accordance with this invention is used to effect the method of the invention. The assembly comprises at least one rotatable drum which provides a washing zone. The drum has an inner structural configuration to cause the foodstuff to move from one end to the other end thereof when the drum is rotated. Feed means are used to introduce the foodstuff into one end of the drum at a rate faster than the rate the foodstuff passes through the drum to form a buildup of the foodstuff. As the buildup of foodstuff moves through the washing zone provided in the rotatable drum, nozzle means impinge washing liquid directly thereon. A gentle swaying motion prevents any damage from occurring to the foodstuff. At the same time, the movement within the buildup of foodstuff together with the washing liquid causes the foodstuff to become thoroughly cleaned. The inner structural configuration of the rotating drum provides the necessary means for carrying the foodstuff circumferentially when the drum is rotated and means to effect movement of the foodstuff in a forward direction through the drum.

In a very specific embodiment of the invention, mushrooms are placed in one end of the assembly and caused to move through the washing zones established by the assembly in a period of time of less than about 90 seconds. The specific embodiment of the assembly incorporates two rotatable drums mounted adjacent each other with means to transfer foodstuff from the first drum to the second drum. The first and second drums provide a first washing zone and a second washing zone, respectively. The assembly incorporates means to effect different rotational speeds to the respective drums. The second drum is tilted upwardly to cause the mushrooms to be moved along an upwardly directed incline from one end of the second drum to the other end thereof. This effects a larger buildup of mushrooms in the second drum than was present in the first rotating drum.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a plan view of an assembly made in accordance with this invention,

FIG. 2 is a partial sectional end view of a rotatable drum made in accordance with this invention, FIG. 3 is a side plan view of a rotatable drum made in accordance with this invention, FIG. 4 is a sectional view taken along line 4—4 of FIG. 2.

DESCRIPTION OF SPECIFIC EMBODIMENT

Figure 5:
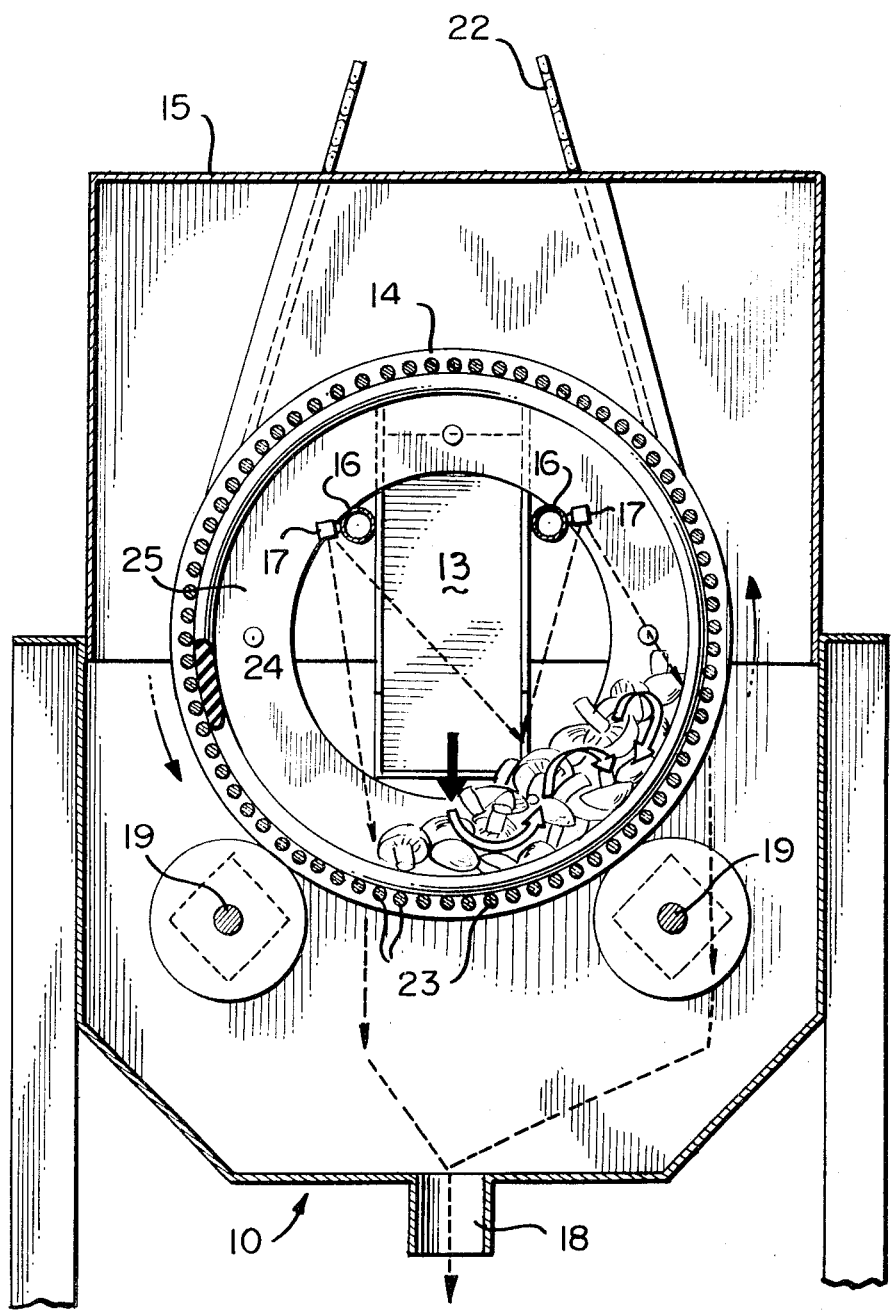
FIG. 5 is a sectional view taken along line 5—5 of FIG. 4.

More specifically, an assembly made in accordance with this invention is shown in FIG. 1 with a first washer, generally designated 10, and a second washer, generally designated 11. Each of the washing machines 10 and 11 has substantially identical construction with respect to the washing zone provided, the manner of loading and the manner in which the foodstuff travels therethrough. In this specific embodiment, a load of mushrooms is first supplied to a grader and sizing apparatus 12. The mushrooms are subsequently introduced into the drum 14 of the washing machine 10 by way of the loading chute 13. A transfer chute 26 located between the washing machines 10 and 11 provides a means to transfer the mushrooms from a first washing zone into a second washing zone. The washing liquid in this specific embodiment is water, which is supplied to each of the washing machines 10 and 11 by way of the pipe structure 16. The used water is discharged with the refuse material through the drain 18 after the water has been impinged directly onto the mushrooms passing through the washing zones.

A further feature of this invention as depicted in this specific embodiment requires the loading of the mushrooms into the first washing machine at a rate faster than the rate the mushrooms pass through the washing zone. This rate relationship thereby forms a buildup of foodstuff. The buildup of mushrooms is shown in FIGS. 4 and 5. The annular flange 25 keeps the mushrooms contained within the drum 14 when it is rotating. Jets of washing liquid such as water are sprayed into the washing zone to impinge directly onto the foodstuff as shown in FIGS. 4 and 5 by the arrows directed downwardly from the nozzles 17. In the operation of this specific embodiment, the drum 14 is rotated in counter-clockwise direction by way of the drive mechanism 21 and the chain drive 22.

Stainless steel rods 23 are mounted inside the drum 14 and extend in a longitudinal direction along the washing zone. In addition, a plastic tubing 24 constituting a rib means is mounted on the inside of the drum 14. The rib means provides a plurality of convolutions longitudinally displaced in spaced relationship with respect to each other along the inner surface of the drum. This relationship is clearly shown in FIG. 14. It is noted that the convolutions of the drum 14 in this specific embodiment are irregularly spaced as shown by the different spacings A and B. This spacing of plastic tubing causes the mushrooms to change position relative to one another. It has been found that this type of irregular spacing enhances the swaying and tumbling movement of the mushrooms as they pass through the rotating drum. In this embodiment, the spacing A is approximately 6 inches and the spacing B is approximately 10 inches. Plastic tubing 24 is located along a helical path and thereby moves the mushrooms forwardly through the assembly as shown by the arrows depicted in FIG. 1.

While the drum 14 is rotating, the mushrooms tend to be carried circumferentially due to the movement of the drum, the structure of the tubing 24 and the longitudinally extending rods 23.

The drum 14 is supported on bearings (not numbered) which are located on the bearing rods 19. Each of the washing machines 10 and 11 is constructed substantially the same. However, it is noted that the frame structures (not numbered) in this specific embodiment maintain the substantially identical drums 14 and 27 at different levels with respect to each other. When the mushrooms pass from the drum 14 to the drum 27 through the transfer chute 26, a further buildup occurs in the drum 27. The buildup occurs because of the inclined mounting of the drum 27 in the washing machine 11. The gear mechanisms associated with the drive motors 21 and 28 are constructed to rotate the drums 14 and 27 at different speeds. The drums 14 and 27 provide washing zones that are approximately 6 feet long. The drums 14 and 16 have 16 inch diameters and include discharge zones toward each end thereof. The discharge zones are approximately 10 to 12 inches in length. In this specific embodiment, the discharge zones of the drums do not include longitudinally extending stainless steel rods.

In operation, the first washing drum 14 is rotated at a single revolution every 5 seconds in a counter-clockwise direction. The speed of the second washing drum 27 is one revolution every 2½ seconds. The second drum 27 runs approximately twice as fast as the first drum 14. The angle of tilt for the second drum 27 is approximately 10° as shown in FIG. 1. The structural relationship in the assembly requires the mushrooms to move upwardly along an incline from the one end of the drum 27 to the other end thereof. As the mushrooms pass through the washers 10 and 11, they literally wash themselves due to the direct impingement of washing liquid onto the large buildup of mushrooms occurring within the respective washing zones. As the mushrooms are carried circumferentially up the side of either of the drums 14 and 27, the action of the tubing 24 and gravitational force cause the mushrooms to fall downwardly. Since there is a buildup of mushrooms, the fall downwardly is very gentle and the mushrooms rub together. This tumbling action together with the direct impingement of the water effects a thorough washing of the mushrooms. There is a constant swaying, tumbling and forward movement through each of the washing machines 10 and 11.

Once the fresh mushrooms have traveled the entire length of the washing machine 11, they are subsequently discharged onto a conveyor 38 to a subsequent packaging operation for the fresh market.

Because mushrooms tend to absorb water, a close control of the speeds of the drums 14 and 27 has to be maintained. It is very important that fresh mushrooms are not washed any longer than about 90 seconds. If they are subjected to the washing liquid medium any longer, they will tend to absorb too much of the liquid. Liquid absorption is very detrimental to the marketing of fresh mushrooms which must be stored and packaged. The absorption of liquid by the mushrooms will tend to produce spoilage over an extended period of time.

It is noted that the specific speeds of rotation and the size of the drums being rotated must be correlated in such a manner as to maintain the total time within the washing zones to less than about 90 seconds for the washing of fresh mushrooms. It is possible to wash approximately 2500 pounds of fresh mushrooms an hour using the assembly and techniques as disclosed herein.

While the method and apparatus for treating foodstuff has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An assembly for treating mushrooms comprising:
   a. means mounting at least one rotatable drum to provide a treating zone for the mushrooms, and
   b. means to rotate the drum causing the mushrooms to have a swaying and tumbling motion,
   c. said drum having an inner structural configuration to cause the mushrooms to move from one end to the other end thereof when the drum is rotated,
   d. said inner structural configuration including means to carry the mushrooms circumferentially when the drum is rotated and rib means disposed on a helical path on the inner surface of the carrying means and projecting inwardly to effect said movement,
   e. said rib means including a plurality of convolutions longitudinally displaced in irregular spaced relationship with respect to each other along the inner surface of the drum whereby the irregular spacing causes an irregular movement of the mushrooms through the drum thereby causing the mushrooms to bunch and rub against each other.

2. An assembly as defined in claim 1 wherein
   feed means located at one end of the drum is used to introduce the mushrooms into one end of the drum at a rate faster than the rate the mushrooms pass through the drum to form a buildup thereof and
   nozzle means located within the drum is used to impinge a liquid directly on the mushrooms for effecting a wash treatment.

3. An assembly as defined in claim 1 wherein nozzle means is disposed within the drum to spray liquid only downwardly and at an angle displaced from the vertical in the direction of rotation of the drum whereby the liquid is impinged directly on the mushrooms being carried circumferentially by the rotating drum.

4. An assembly for treating mushrooms comprising:
a. two drums rotatably mounted adjacent each other providing first and second treating zones, respectively,
b. means to transfer mushrooms from the first drum to the second drum,
c. means for rotating the drums independently of each other,
d. said drums having inner structural configurations to cause the mushrooms to move from one end to the other end thereof when the drums are rotated,
e. said inner structural configurations including means to carry the mushrooms circumferentially when the drums are rotated and rib means disposed on a helical path on the inner surface of the carrying means and projecting inwardly to effect said movement
f. said rib means including a plurality of convolutions longitudinally displaced in irregular spaced relationship with respect to each other along the inner surfaces of the drums whereby the irregular spacing causes an irregular movement of the mushrooms through the drums thereby causing the mushrooms to bunch and rub against each other.

5. An assembly as defined in claim 4 wherein
means is provided to tilt the second drum with respect to the horizontal to cause mushrooms to be moved along an upwardly directed incline from one end of the second drum to the other end thereof and form a larger buildup of mushrooms therein than in the first drum which is maintained in a substantially horizontal position.

6. An assembly as defined in claim 4 wherein
the rotating means includes means to rotate the second drum faster than the first drum.

7. An assembly as defined in claim 4 wherein
nozzle means is disposed within each drum to spray liquid only downwardly and at an angle displaced from the vertical in the direction of rotation of the drum whereby the liquid is impinged directly on the mushrooms being carried circumferentially by the rotating drum.

* * * * *